United States Patent
Dastidar et al.

(10) Patent No.: US 11,983,264 B2
(45) Date of Patent: May 14, 2024

(54) ADAPTIVE ACCELERATION OF TRANSPORT LAYER SECURITY

(71) Applicant: XILINX, INC., San Jose, CA (US)

(72) Inventors: Jaideep Dastidar, San Jose, CA (US); Aman Gupta, Sunnyvale, CA (US); Krishnan Srinivasan, San Jose, CA (US); Sagheer Ahmad, Cupertino, CA (US)

(73) Assignee: XILINX, INC., San Jose, CA (US)

(*) Notice: Subject to any disclaimer, the term of this patent is extended or adjusted under 35 U.S.C. 154(b) by 234 days.

(21) Appl. No.: 17/457,839

(22) Filed: Dec. 6, 2021

(65) Prior Publication Data

US 2023/0177146 A1 Jun. 8, 2023

(51) Int. Cl.
*G06F 21/54* (2013.01)
*G06F 21/62* (2013.01)
*G06F 21/85* (2013.01)

(52) U.S. Cl.
CPC .......... *G06F 21/54* (2013.01); *G06F 21/6209* (2013.01); *G06F 21/85* (2013.01)

(58) Field of Classification Search
CPC ...... G06F 21/54; G06F 21/6209; G06F 21/85; G06F 21/72; H04L 9/006; H04L 63/0485; H04L 63/166
See application file for complete search history.

(56) References Cited

U.S. PATENT DOCUMENTS

| | | | |
|---|---|---|---|
| 8,112,803 B1* | 2/2012 | Satish | H04L 63/1441 713/153 |
| 10,673,439 B1* | 6/2020 | Ahmad | H03K 19/17736 |
| 11,063,594 B1* | 7/2021 | Ahmad | H03K 19/1776 |
| 2009/0113214 A1* | 4/2009 | Dolgunov | G06F 21/556 713/189 |
| 2011/0274110 A1* | 11/2011 | Mmmadi | H04L 49/30 370/392 |
| 2017/0373844 A1* | 12/2017 | Sykora | H04L 63/0428 |
| 2019/0220601 A1* | 7/2019 | Sood | G06F 9/505 |
| 2020/0012509 A1* | 1/2020 | Khan | G06F 9/45558 |

OTHER PUBLICATIONS

Al-Zubaidie, Mishall et al. "Efficient and Secure ECDSA Algorithm and its Applications: A Survey." ArXiv abs/1902.10313 (2019).
(Continued)

*Primary Examiner* — J. Brant Murphy
(74) *Attorney, Agent, or Firm* — Patterson + Sheridan, LLP

(57) ABSTRACT

Embodiments herein describe offloading encryption activities to a network interface controller/card (NIC) (e.g., a SmartNIC) which frees up server compute resources to focus on executing customer applications. In one embodiment, the smart NIC includes a system on a chip (SoC) implemented on an integrated circuit (IC) that includes an embedded processor. Instead of executing a transport layer security (TLS) stack entirely in the embedded processor, the embodiments herein offload certain TLS tasks to a Public Key Infrastructure (PKI) accelerator such as generating public-private key pairs.

20 Claims, 4 Drawing Sheets

(56) References Cited

OTHER PUBLICATIONS

Lien, E., "Efficient Implementation of Elliptic Curve Cryptography in Reconfigurable Hardware," Dept. of Electrical Engineering and Computer Science, Case Western Reserve University, May 2012, 77 pages.
Taplin, Mark, "Improving Agility and Security Using Mellanox SmartNICs", Nov. 30, 2019.
Schweitzer, Scott, SmartNIC Architectures: A Shift to Accelerators and WHY FPGAs are Poised to Dominate, Feb. 26, 2021.

* cited by examiner

ADAPTIVE ACCELERATION OF TRANSPORT LAYER SECURITY

TECHNICAL FIELD

Examples of the present disclosure generally relate to performing transport layer security (TLS) in a Smart Network Interface Controller/Card (SmartNIC).

BACKGROUND

Secure client-server communication systems as well as peer-to-peer communication networks typically rely on a two-step encryption process. In a first phase, which is relatively shorter in duration compared to the overall communication, two communicating agents (e.g., a client and server) securely exchange session keys. The first phase typically employs asymmetric encryption, where the information exchanged is used to generate the longer lived Master or Primary keys used by the client and server respectively. Asymmetric encryption is more computationally intensive and thus also incurs larger latency.

The first phase is followed by a second phase, which is relatively longer in duration compared to the overall communication, which entails the secure exchange of information encrypted using the session keys exchanged during the first phase. The second phase typically employs symmetric encryption where the information exchanged is encrypted using the shorter lived session keys. Symmetric encryption, is less computationally intensive and also incurs significantly lower latency.

A larger number of session keys can be employed to service a large number of client connections, and also a particular client connection can continually roll or replenish the session keys used, according to a key expiration schedule, to increase secure communication. The Internet Engineering Task Force (IETF) Transport Layer Security (TLS) 1.3 is an example industry standard which enables both phases of the encryption process, referring to the first phase as the handshake protocol, and referring to the second phase as the record protocol. Agents from multiple manufacturers running different software stacks that comply with the standard can interoperate seamlessly to exchange session keys to establish secure communication channels.

SUMMARY

Techniques for operating a SmartNIC are described. One example is an SmartNIC that includes a processor core configured to execute an operating system (OS) where the processor core is assigned a non-spoofable physical identifier to indicate the OS is an authorized requesting agent for retrieving public-private key pairs and an interconnect coupled to the processor core and including circuitry defining trusted pathways that are at least one of: physically isolated from untrusted pathways in the interconnect or logically isolated such that the trusted pathways are access controlled from untrusted agents in the interconnect. The SmartNIC also includes a Public Key Infrastructure (PKI) accelerator including circuitry configured to generate the public-private key pairs and access control circuitry coupled between the interconnect and the PKI accelerator and configured to ensure only that the authorized requesting agents with correct non-spoofable physical identifiers are permitted to access the public-private key pairs generated by the PKI accelerator.

One example described herein is a SmartNIC that includes a hardened processor core configured to execute a first operating system (OS), wherein the processor core is assigned a first non-spoofable physical identifier to indicate the first OS is a first authorized requesting agent for retrieving public-private key pairs, a programmable logic (PL) core configured to execute a second OS where the PL core is assigned a second non-spoofable physical identifier to indicate the second OS is a second authorized requesting agent for retrieving public-private key pairs, and a Public Key Infrastructure (PKI) accelerator coupled to the interconnect comprising circuitry configured to generate the public-private key pairs. The SmartNIC also includes an interconnect configured to facilitate communication between the PKI accelerator and the processor and PL cores where the interconnect includes circuitry to ensure only authorized requesting agents comprising correct non-spoofable physical identifiers are permitted to retrieve the public-private key pairs generated by the PKI accelerator.

One example described herein is a method that includes writing, using a requesting agent, operation parameters for generating a public-private key pair into memory in a SmartNIC where the requesting agent is one of a hardened processor core or a programmable logic core in the SmartNIC and the requesting agent is assigned a non-spoofable physical identifier to indicate the requesting agent is authorized for retrieving public-private key pairs. The method also includes reading the operation parameters using a Public Key Infrastructure (PKI) accelerator, generating the public-private key pair using the PKI accelerator, writing, using the PKI accelerator, the public-private key pair into the memory, and transmitting an interrupt to the requesting agent indicating the public-private key pair is ready. Moreover, the access control circuitry is communicatively coupled between the requesting agent, and the memory and the PKI accelerator, and the access control circuitry ensures only authorized requesting agents with correct non-spoofable physical identifiers are permitted to access the public-private key pair stored in the memory.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
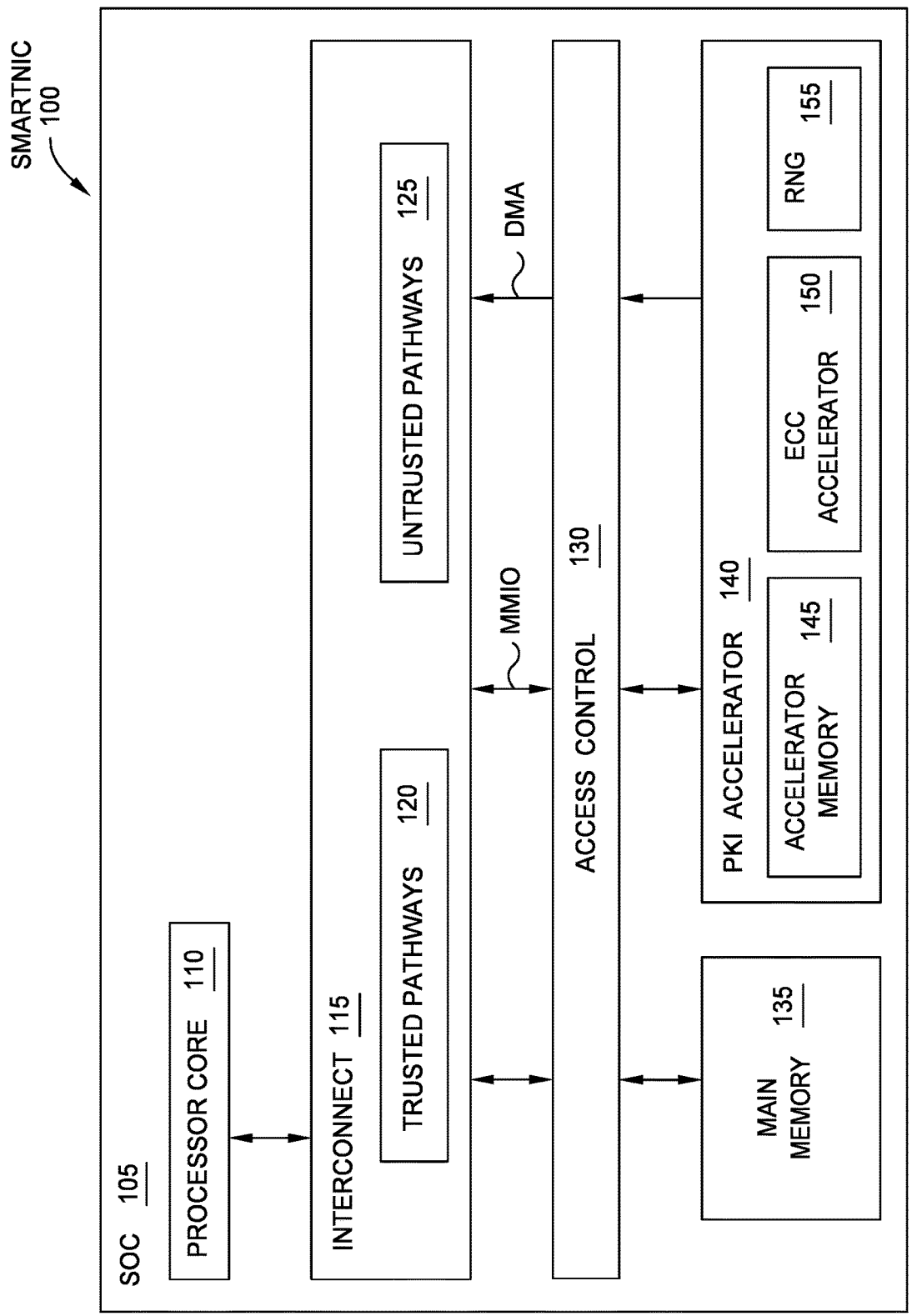
FIG. 1 is a block diagram of a SmartNIC that performs adaptive TLS acceleration, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe offloading encryption activities to a SmartNIC which frees up server compute resources to focus on executing customer applications. Typical NICs, unlike a smart NIC, cannot be used to offload host/server functions. That is, by using a smart NIC (referred to as SmartNIC herein), functions and processes that would otherwise have to be performed on the host/server can be offloaded and performed using compute resources in the smart NIC.

In one embodiment, the SmartNIC includes a system on a chip (SoC) implemented on an integrated circuit (IC) that includes an embedded processor. Instead of executing a TLS stack entirely in the embedded processor, the embodiments herein offload certain TLS tasks to a Public Key Infrastructure (PKI) accelerator such as generating random numbers used for seeding public and private keys, generating public-private key pairs, verifying server certificates, and performing Elliptic Curve Diffie-Hellman (ECDH) point multiplications. Further, the encryption tasks can be scaled by adding processing engines in programmable logic (PL), assuming the SoC includes a PL fabric.

As described in more detail below, using a SmartNIC to perform key generation and exchange tasks can reduce overhead relative to a centralized key generation and exchange scheme by avoiding overhead used to wrap and unwrap centrally generated session keys. Further, by offloading tasks to a PKI accelerator in the SmartNIC, the embodiments herein do not rely solely on a fixed function block where the performance is fixed at implementation time in terms of the key pair or session key generation rate.

FIG. 1 is a block diagram of a SmartNIC 100 that performs adaptive TLS acceleration, according to an example. The SmartNIC 100 can be part of a cloud computing environment's hyper-converged infrastructure (HCI), giving the cloud vendor a simpler way to manage a single customer's or multiple customers' varying compute-centric, network-centric, and storage-centric workloads. SmartNICs (also referred to as Data Processing Units (DPUs)) are adept at converging offload acceleration in one component, and also offer the cloud vendor a way to manage virtualization and security where multiple cloud tenants concurrently use this common, pervasive hyper-converged infrastructure. Hyperscale deployments of these components in the millions of units make power consumption a key metric of SmartNICs where a one watt increase in the components' consumed power can mean megawatts of increase in data center power consumption. This makes highly efficient offload acceleration in a power efficient manner a key metric in a data center.

Another key metric of SmartNICs is secure communication. Because a SmartNIC can perform tasks for multiple cloud tenants, the SmartNIC may have means to ensure that cloud tenants cannot eavesdrop on another cloud tenant's information. Given that there can be millions of SmartNIC facilitating communication between each other, there is a need to establish secure communication networks for those tenants and their offload acceleration functions. Furthermore, even within each cloud tenant (e.g., a corporation), there can be a need for keeping confidential information of one department of the corporation with insider information, e.g. finance or legal, from accidental or malicious eavesdroppers in the rest of the corporation.

Further, with modern public cloud infrastructure being pervasive and reliable, the trend lately has been for government entities to, instead of building their own secure private cloud infrastructure, award cloud contracts to public cloud infrastructure providers. This adds a new requirement for autonomous security in the components to ensure that the government entity's encryption keys used to encrypt and exchange information cannot be accessible by the cloud infrastructure provider themselves, as well as ensuring those keys are inaccessible by other cloud tenants.

When used in a cloud deployment, the embodiments herein permit millions of SmartNICs to communicate across all the cloud network securely, encrypt the data movement across tens of millions of tenants sharing the cloud network, use hundreds of millions of session keys in a manner that the key-pair (private key and public session key) is not accessible to either an adversary cloud tenant or the cloud infrastructure provider themselves. In addition, these keys are generated and exchanged in a power efficient manner.

Instead of using either a centralized model where the pair of communication agents comprises distributed compute client nodes which acquire keys with a central data center vendor's key vault or a peer-to-peer model where a pair of communication agents comprise peer compute or storage nodes exchanging keys between each other, the embodiments herein rely on distributed tasks within a SmartNIC which reduces power and improves security. For example, a centralized model for key exchange may rely on a dedicated security appliance which acts on behalf of the cloud infrastructure provider's central key vault. These dedicated security appliances generate and authenticate session keys with millions of distributed compute or storage client nodes. The dedicated security appliance is designed to generate session keys at a very high rate and those wrapped session keys (using a key-encrypted-key) are then distributed to the compute or storage client nodes which then unwrap those session keys and use them for secure communication.

The disadvantages of the centralized model include additional computational overhead since for secure exchange of keys to a pair of compute or storage client nodes for secure peer-to-peer communication, both peers receive their own send session key and the receive session key from the central key vault as wrapped keys so that an adversary cannot access those peers' data using those session keys when they exchange information. Also, to increase secure communication between those peers, a larger number of session keys per peer-to-peer connection may be used to continually roll/replenish session keys. This means that not only must the dedicated security appliance generate hundreds of millions of session keys, the appliance must also wrap those session keys via an additional cryptographic function before distributing wrapped session keys. Meanwhile, the distributed compute or storage client nodes receiving the large number of session keys must add cryptographic engines to unwrap these session keys, thus incurring additional overhead there as well.

Another disadvantage of the centralized model is that while the dedicated security appliances were offloading key-pair generation, the centralized session key generation model does not offload the additional power, cost and complexity of unwrapping the millions of ephemeral session keys at the distributed compute or storage client nodes.

Yet another disadvantage of this model is that a centralized key-vault for the Master or Primary keys gives a nefarious actor a specific location where once the actor gains access, they can steal, manipulate, or destroy information encrypted using valid generated session keys that are used by millions of distributed compute or storage client nodes across the cloud network. Furthermore, the centralized key-vault, which is typically operated under the control of the cloud administrator, does not provide the level of autonomy for tenants who do not trust their keys being available to the cloud infrastructure provider.

The embodiments herein improve or avoid many of the disadvantages of the centralized key generation and exchange model by using a native TLS exchange method in the SmartNIC, and thus, there is no need to incur the additional overhead to wrap and unwrap session keys via an additional cryptographic function before the session keys can be used to encrypt exchanged data. Further, the embodiments herein also rely on built-in encryption and access control methods such that the keys generated and stored in the SmartNIC are not required to be wrapped first. Moreover, the embodiments herein can store the keys in the SmartNIC such that the keys are accessible to only the tenant, and not to other tenants or to the cloud infrastructure provider.

Instead of using a centralized model, there are two methods that enable distributed key exchange in SmartNICs, both of which involve having the key-exchange done as peer-to-peer operations, thus not requiring a centralized key vault to store the Primary, Private, or Master keys. The first method is for SmartNIC devices to run the entire TLS 1.3 stack on a large number of embedded processor cores in the SmartNIC. The embedded processors provide offload acceleration for a large number of functions and treat the cryptographic steps to execute TLS1.3 as just one of those many functions to execute.

However, the disadvantage of relying solely on embedded processors in the SmartNIC is three-fold. First, it often takes a large number of clock cycles in the processors to execute the type of cryptographic algorithms, such as elliptic-curve cryptography (ECC), that are part of the TLS1.3 standard. So even if these SmartNIC devices offer a large number of embedded processors, the cryptographic algorithms are executed at a low rate, thus setting a low ceiling on the rate at which new public-private key pairs or session keys can be generated (thus compromising security). Second, the service of other offload acceleration functions, which could run on the set of embedded processors, is stalled or slowed down while the cryptographic algorithms are being executed. This compromises the very reason SmartNICs may be used, which is being able to concurrently offload a variety of storage, network, and compute functions simultaneously, and across multiple tenants. If the processors are essentially operating full-time on inefficiently performing cryptographic algorithms, the SmartNIC's value in the data center may be reduced. Third, since a large number of embedded processors are concurrently executing a variety of storage, network, and compute functions along with the cryptographic algorithms, the processor cores running the cryptographic algorithms are vulnerable to side-channel attacks to steal the generated key-pairs or session keys.

The second method for enabling distributed key exchange in SmartNICs is for SmartNIC devices to extend the application specific integrated circuit (ASIC) methodology to creating a HardIP block as an accelerator for the large number of embedded processors. While the processors run the non-cryptographic steps of the TLS 1.3 software stack, the HardIP block is dedicated to running the cryptographic steps to execute TLS1.3. The disadvantage of using this approach is three-fold. First, since the HardIP block is a fixed function block, the decision has to be made at implementation time (e.g., when the SmartNIC is designed) in terms of the key-pair or session key generation rate. The rate is capped at the fixed function accelerator's capabilities, even if the SmartNIC has a need for a higher generation rate of either key-pairs or session keys. Second, as mentioned earlier, traditional SmartNIC devices provide offload acceleration for a variety of network, storage, and compute functions. It is possible that an offload accelerator, such as a deep learning inference accelerator wants to use session keys to decrypt receive (typically post-decompression) data, or send (typically post-compression) data or inference results in an encrypted format in order to protect the client's inference data and results. That accelerator now has to make calls to the embedded processors to act on its behalf to acquire the session keys, thus creating an inefficient level of indirection. This also opens the deep learning accelerator to security vulnerabilities. Third, this approach continues to be impacted by the same vulnerability mentioned earlier, of side-channel attacks due to the fact that the TLS1.3 software stack is being executed concurrently with other offload acceleration applications. The resultant key-pair and sessions keys are returned to the software routine running on the processor cores that called the accelerator.

However, the embodiments described offer improvements relative to the centralized key generation and exchange model, which is performed without using SmartNICs, and the two decentralized methods of using SmartNICs to generate the key pairs or session keys discussed above. Unlike the centralized key generation and exchange model, the embodiments herein may use a native TLS exchange method (e.g., the TLS1.3 secure client/server method), and thus there is no need to incur the additional overhead to wrap and unwrap session keys via an additional cryptographic function before the session keys can be used to encrypt exchanged data. Further, the embodiments herein can rely on built in encryption and access control methods such that the keys generated and stored on die are not required to be wrapped first.

Unlike the first distributed method of using SmartNICs, the embodiments herein do not have to rely on embedded processors to run the entire TLS stack (although that option still exists if a customer desires it). Unlike the second distributed method of using SmartNICs, the embodiments herein also do not have to rely solely on a fixed function block where the performance is fixed at implementation time in terms of the key-pair or session key generation rate. Instead, the embodiments herein allow for adaptive levels of performance such that hardened crypto acceleration or random number generation for the TLS stack can occur as dimensioned in the HardIP, or augmented by programmable logic. Further, the agents making the TLS function calls to the PKI accelerator can be either embedded processors, or programmable logic cores, or a combination of the two should performance demands increase beyond the capabilities of the hardened crypto acceleration.

Figure 3:
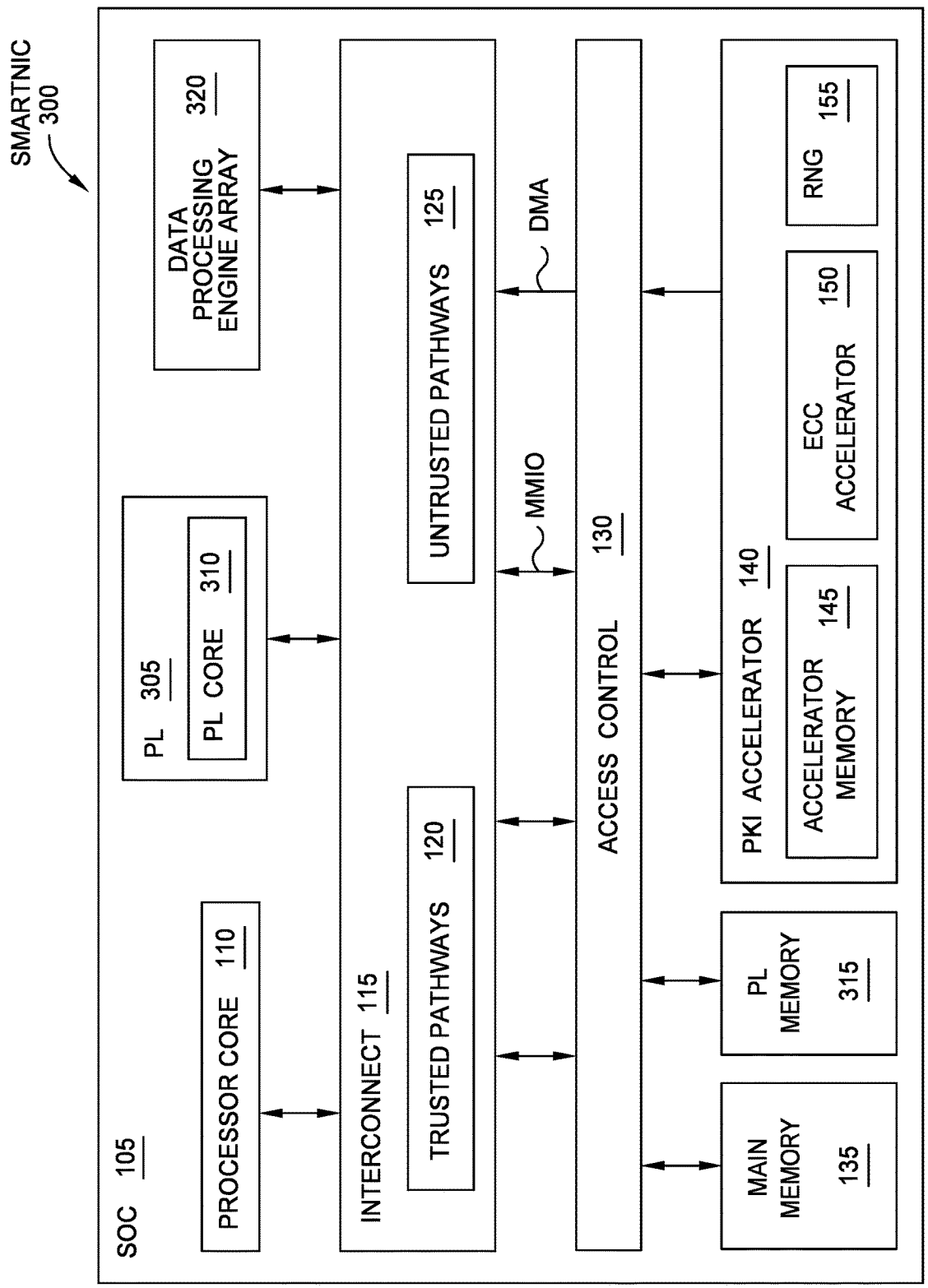
FIG. 3 is a block diagram of a SmartNIC that performs adaptive TLS acceleration, according to an example.

Unlike distributed methods of using a SmartNIC, other offload accelerators such as deep learning inference accelerators (which are shown in FIG. 3), do not have to make calls to the embedded processors to act on its behalf. The embodiments herein allow for other offload accelerators to directly interface to the PKI accelerator via either a HardIP Network-on-Chip or a Programmable Logic interface. Also, the service of other offload acceleration functions that could run on the set of embedded processors are not stalled or delayed while the cryptographic algorithms are being executed, thus achieving the concurrent offload of a variety of storage, network, and compute functions simultaneously, and across multiple tenants.

Unlike the techniques discussed above which are vulnerable to side-channel and voltage glitch attacks, the embodiments herein provide for trusted requesting agents being physically separated from adjacent untrusted agents. Further, access from the trusted agent to a PKI accelerator 140 can be either via a path that is physically isolated from other agents, or logically isolated from other agents via access control checks of authorized source agents by means of an unmodifiable physical identifier and encrypted and authenticated firewall rules. The key pairs or session keys that are subsequently generated by the PKI accelerator 140 can then be stored in on-chip or encrypted off-chip memory with access control attributes such that only trusted requesting agents have access to those results. The embodiments herein comprehends accelerator memory co-located with the PKI accelerator 140 such that the same access controlled path by which the authorized source agent provided the command descriptor with secure metadata to the PKI accelerator 140, is the path by which the resultant key pairs or session keys generated by the PKI accelerator 140 are subsequently accessed. While all these measures prevent side-channel attacks from stealing the generated key-pairs or session keys, the embodiments can also include setting alarms and actions to shut down the system when the adversary violates access control or attempts voltage glitch attacks on the trusted compute agents in an attempt to steal the private/master key or session keys.

Turning to the details in FIG. 1, the SmartNIC 100 includes a SoC 105. The SoC 105 can be implemented using a single IC. However, in other embodiments, the SmartNIC 100 may include multiple SoCs (multiple ICs) that are communicatively coupled either directly (e.g., a stack of bonded ICs) or via a substrate (e.g., a silicon interposer).

In this embodiment, the SoC 105 includes a processor core 110, interconnect 115, access control 130, main memory 135, and a PKI accelerator 140. In one embodiment, all these components are in a processor in the SoC 105. For example, these components may be a processor system (or processor subsystem) in the SoC 105. Although not shown, the SoC may also include other components such as a network on a chip (NoC), programmable logic, an array of data processing engines, and I/O interfaces. Some or all of these additional hardware components can be communicatively coupled to the hardware components illustrated in FIG. 1.

The processor core 110 includes circuitry for executing an embedded operating system (OS). This OS can include software and firmware executing in the processor core 110. While one processor core 110 is shown, the SoC 105 may have multiple cores 110 that each executes an embedded OS.

In one embodiment, the processor core 110 represents an embedded HardIP scalar processor capable of running the TLS (e.g., TLS 1.3) software stack. That is, the OS executing on the core 110 can run the TLS software stack. Further, the core 110 may be running the TLS stack within a Trusted Execution Environment (TEE). In one embodiment, the processor core 110 and its interface to the interconnect 115 (e.g., an Application Processing Unit (APU) interconnect) is physically isolated from the rest of the embedded processor cores in the SoC 105 (not shown) running untrusted code.

Moreover, in one embodiment, the processor core 110 has a non-spoofable physical identifier that is used to ascertain that it is authorized to send/retrieve key-pair or session key information. This prevents other processor cores running untrusted code from accessing the key-pairs or session key information stored in the memory (e.g., the main memory 135 or the accelerator memory 145).

In one embodiment, the processor core 110 also runs its TEE Trusted OS in lockstep mode in order to detect voltage glitch attacks in an attempt to steal those keys. For example, at least two processor cores 110 can run their OSs in lockstep in the TEE so that voltage glitch attacks on one core 110 can be detected by the other core 110.

The interconnect 115 represents the on-chip interconnect that facilitates communication between the illustrated components in the SoC 105. The interconnect 115 is structured such that traffic pathways are physically isolated between the components communicating in the TEE and untrusted components. As shown, the interconnect 115 includes trusted pathways 120 used by the components in the TEE and untrusted pathways 125 used by components not within the TEE. The trusted pathways 120 are physically separate from the untrusted pathways 125. As a result, the untrusted components (e.g., a processing core 110 executing untrusted code not associated with cryptography) are physically unable to access the trusted pathways 120. This makes it impossible for the components not within the TEE to access the trusted pathways 120 and the encryption data (e.g., key-pairs and session keys) being transmitted on these pathways 120.

The interconnect 115 also propagates the non-spoofable physical identifiers of the processor cores 110 in the TEE to their respective destinations (e.g., the access control 130, the main memory 135, or the PKI accelerator 140). In one embodiment, the interconnect 115 is also structured such that the routing attributes of the interconnect 115 that determine which traffic from which source and to which destination ensure that the pathways 120, 125 traversed are authorized and physically isolated.

The main memory 135 (e.g., random access memory (RAM)) represents the main memory port(s) of the on-chip interconnect 115 which can support traffic to these destinations in a cache coherent manner. That is, the main memory 135 as well as the memory 145 may be cache coherent with caches in the processor core 110 and the caches in the interconnect 115. In one embodiment, the main memory 135 is where the send/retrieve key-pair or session key information is written or stored by the PKI Accelerator 140 via the interconnect 115 for retrieval by a requesting agent (e.g., the TLS software stack executing in the processor core 110).

In one embodiment, the main memory 135 is where the requesting agent writes command descriptors with secure metadata where these descriptors are subsequently read by the PKI accelerator 140 via a port in the interconnect 115. Because these destinations can be supported in a cache coherent manner, both the command descriptors with secure metadata and the key-pairs or session keys can be cached in either the caches of the processor core 110 or the caches in the interconnect 115.

In one embodiment, the main memory 135 can include two types of cache coherent main memory destination: DDR with inline encryption, such that key-pairs or session keys are not visible off-chip in DRAM, and on-chip memory (OCM).

The interconnect 115 includes a Memory Mapping I/O (MMIO) port that represents the MMIO or Device Memory port(s) of the interconnect 115 which can support traffic to the PKI accelerator 140 with strict read/write ordering semantics. In one embodiment, there are two types of device memory destinations. A first destination where the MIMO port transmits data to the accelerator memory 145 (also referred to as tightly coupled memory (TCM)) and a second destination where the MIMO port transmits data directly to an ECC accelerator 150. The TLS stack or OS in the processing core 110 can write command descriptors with secure metadata in an in-order manner to either the accelerator memory 145 or the ECC accelerator 150. The PKI accelerator 140 can subsequently write the key-pairs or session keys to the accelerator memory 145 (or the main memory 135) for retrieval by the TLS stack or OS.

The PKI Accelerator 140 also includes a random number generator (RNG) 155 used when the command descriptors request the generation of a key-pair. The PKI accelerator 140 can use one of several asymmetric key cryptographic algorithms that are part of the TLS 1.3 standard (or any other past or future TLS standards) to generate the key-pair.

The access control 130 (e.g., a memory protection unit) includes circuitry that ensures only that authorized requesting agents (e.g., OS and cores 110 in the TEE) and the PKI Accelerator 140 via the path labeled direct memory access (DMA), expressing the correct non-spoofable physical identifiers can access their designated memory or configuration register destinations corresponding to the main memory 135, the accelerator memory 145, and the ECC accelerator 150.

Figure 2:
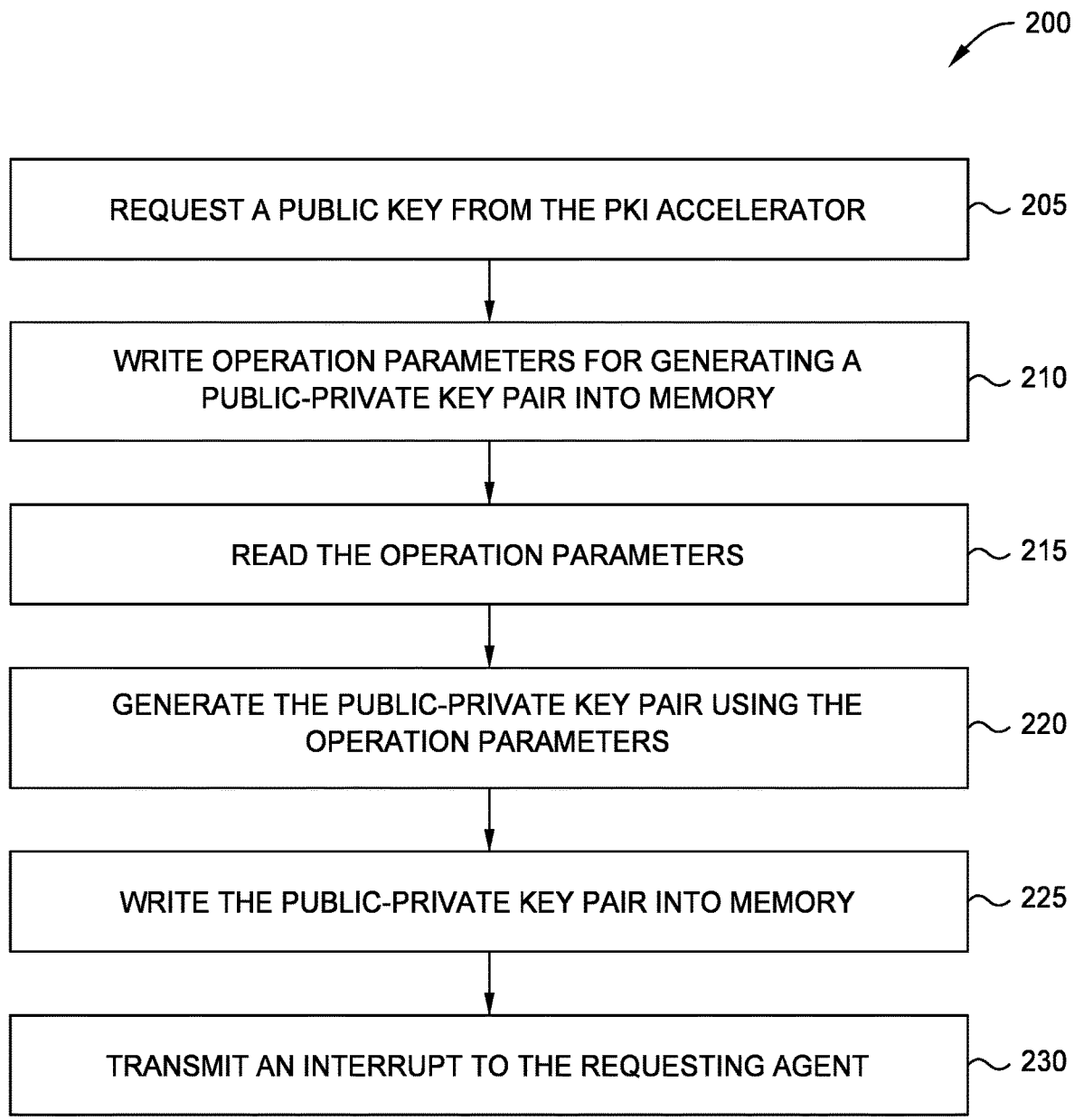
FIG. 2 is a flowchart for generating public-private key pairs, according to examples.

FIG. 2 is a flowchart of a method 200 for generating public-private key pairs, according to examples. At block 205, a requesting agent (e.g., a processing core, or a TLS stack or OS in the processor core) requests a public key from the PKI accelerator. As shown in FIG. 1, the request traverses the interconnect 115 and the access control 130 before reaching the PKI accelerator 140. Because the request originated from a requesting agent in the TEE, the request uses the trusted pathways 120 to traverse the interconnect 115. Further, the access control 130 can check the non-spoofable physical identifier in the request to ensure the requesting agent is permitted to transmit data to the PKI accelerator 140. If the request came from a requesting agent that is not permitted to use the PKI accelerator 140 (e.g., a processor core with an OS or application executing untrusted code not in the TEE), the access control 130 can block the request from reaching the PKI accelerator 140.

In one embodiment, to generate the public key, the requesting agent requests a random number from the RNG in the PKI accelerator (e.g., a 512-bit random number that is used to derive the public key). The RNG then uses the interconnect to return the random number to the requesting agent.

At block 210, the requesting agent writes operation parameters for generating a public-private key pair into memory. These operation parameters initiate a PKI operation for generating the key pair. The operation parameters can include an operation type (e.g., an ECC Point Multiplication (PM)), the public key (e.g., the 512-bit random number), a cryptography algorithm to be used to generate the private key, and the like. While the embodiments herein describe using ECC as the encryption algorithm, the embodiments herein are not limited to such and can be used to perform other types of asymmetric encryption algorithms such as the Rivest, Shamir and Adelman (RSA) algorithm, and the like. Moreover, symmetric encryption techniques such as Advanced Encryption Standard (AES) and Secure Hash Algorithm (SHA) also can perform roles in the TLS algorithm as part of authentication functions (e.g., to create a hash) and certification functions (e.g., verification that the hash provided by the peer is authentic).

In one embodiment, the requesting agent writes the operation parameters into the memory in the PKI accelerator (e.g., the accelerator memory 145 in FIG. 1). In this case, the requesting agent programs the ECC accelerator (e.g., the ECC accelerator 150) in the PKI accelerator to read the operation parameters from the accelerator memory. Because the accelerator memory and the ECC accelerator are both in the PKI accelerator, the ECC accelerator does not need to use the interconnect to access the operation parameters but can directly access the accelerator memory.

In another embodiment, the requesting agent writes the operation parameters into the main memory (e.g., the main memory 135 in FIG. 1). In this case, the requesting agent programs the ECC accelerator in the PKI accelerator to read the operation parameters from the main memory using the DMA port of the interconnect (e.g., the interconnect 115 in FIG. 1). In either case, both of these memories are accessible to the ECC accelerator. Programming the ECC accelerator to know where to access the write operation starts a PKI operation in the ECC accelerator to generate the key pair.

At block 215, the ECC accelerator reads the operation parameters from the secure memory, e.g., the main memory or the accelerator memory.

At block 220, the ECC accelerator generates the public-private key pair using the operation parameters. In one embodiment, the ECC accelerator performs an ECC 384 PM, but as mentioned above, this is only one suitable encryption algorithm that can be performed.

At block 225, the ECC accelerator writes the public-private key pair into memory. Again, this could be the accelerator memory or the main memory.

At block 230, the ECC accelerator transmits an interrupt to the requesting agent (e.g., processor core, or the TLS stack or OS executing in the processor core). The interrupt informs the requesting agent that the public-private key pair is ready for retrieval in the memory. Advantageously, the requesting agent can perform other tasks while waiting for the ECC accelerator to generate the key pair. That is, the requesting agent is not stalled while waiting for the ECC accelerator to generate and store the key pair. After writing the operation parameters to the memory at block 210, the requesting agent can perform other tasks. These tasks could be other cryptography tasks, or could be unrelated to cryptography such as a variety of network, storage, and compute functions. After receiving the interrupt, the requesting agent can then retrieve the key pair and provide the public key to external devices (e.g., a client and server) to initiate encrypted data communication.

In one embodiment, the public-private key pairs are used to participate in peer-to-peer communication using asymmetric cryptographic techniques. Once peer-node-A has the public key of peer-node-B, peer-node-A can generate a multiple session keys (derived from a random number generator), encrypt them with peer-node-B's public key, and transmit those session keys to peer-node-B. Peer-node-B is the only one with the private key pair counterpart of the public key that peer-node-A has, and can extract all the session keys sent by peer-node-A.

FIG. 3 is a block diagram of a SmartNIC 300 that performs adaptive TLS acceleration, according to an example. The SmartNIC 300 has the same components as the SmartNIC 100 and is labeled in the same manner. In addition, the SmartNIC 300 includes PL 305, PL memory 315, and an artificial intelligence (AI) engine accelerator 320. The PL 305 represents a PL fabric with configurable logic blocks (CLB) formed from, e.g., look up tables and other programmable circuitry. Unlike the processor core 110 which is formed from hardened circuitry that performs a fixed function, the circuitry in the PL 305 can be programmed to perform different functions. In this case, the PL 305 is programmed to include a PL core 310 that can perform many of the same functions as the processor core 110. In one embodiment, the PL core 310 can execute the TLS stack using an embedded OS. Thus, the PL core 310 can be used to perform the same cryptography tasks as the processor core 110. This provides additional flexibility and scalability to the SmartNIC 300. For example, if the processor core 110 cannot handle all the cryptography tasks as well as the variety of network, storage, and compute functions it is asked to do, the PL 305 can be programmed to include the PL core 310. The processor core 110 can then pass off some or all of the cryptography tasks to the PL core 310.

The PL core 310 and its embedded OS can operate in the TEE, like the processor core 110. Further, the PL core 310 can be assigned a non-spoofable physical identifier to use when communicating with the interconnect 115 to indicate it is an entity that can send/retrieve key-pair or session key information. Thus, the PL core 310 and its OS can be a requesting agent that can initiate the method 200 in order to instruct the ECC accelerator 150 to generate a key pair. That is, both the processor core 110 and the PL core 310, when added to the TEE, can use the PKI accelerator 140 to generate key pairs.

In one embodiment, the PL core 310 represents a SoftIP scalar processor capable of running the TLS software stack. The interface of the PL core 310 to the interconnect 115 is physically isolated in a secure PL shell.

The PL memory 315 can be used to store the operation parameters used to generate the key pairs, and can also store the key pairs once they are generated by the ECC accelerator 150. That is, the PL memory 315 can be part of the TEE and the access control 130 can ensure only authorized requesting agents can access the operation parameters or stored key pairs. Like the main memory 135 and the accelerator memory 145, the PL memory 315 can be cache coherent with the caches in the processor core 110, the PL core 310, and the interconnect 115. Thus, the PL memory 315 is another option that a requesting agent can use to store operation parameters and key pairs which is accessible by the ECC accelerator 150 using the interconnect 115.

The data processing engine array 320 is an example artificial intelligence (AI) inference accelerator with all the isolation and firewalling capabilities previous described for the processing core 110 and PL core 310. While in one embodiment the data processing engine array 320 may not be authorized to access the PKI accelerator (e.g., executes untrusted code/tasks), it can still operate in the same SoC 105 as the processor core 110 and the PL core 310 which are authorized/trusted. The data processing engine array 320 may use the untrusted pathways 125 in the interconnect 115 to communicate with other components in the processor system.

FIG. 3 further illustrates that other offload accelerators such as the data processing engine array 320, do not have to make calls to the embedded processors (e.g., the processor core 110) to act on its behalf. If the data processing engine array 320 is part of the TEE and is authorized to generate and retrieve the key pairs, the structure in FIG. 3 allows for the array 320 (and other offload accelerators not shown) to directly interface with the PKI accelerator 140 via either a HardIP Network-on-Chip (NoC) or the interconnect 115 to generate key pairs. Thus, like the processor core 110 and the PL core 310, the data processing engine array 320 can be an authorized requesting agent for performing the method 200.

Figure 4:
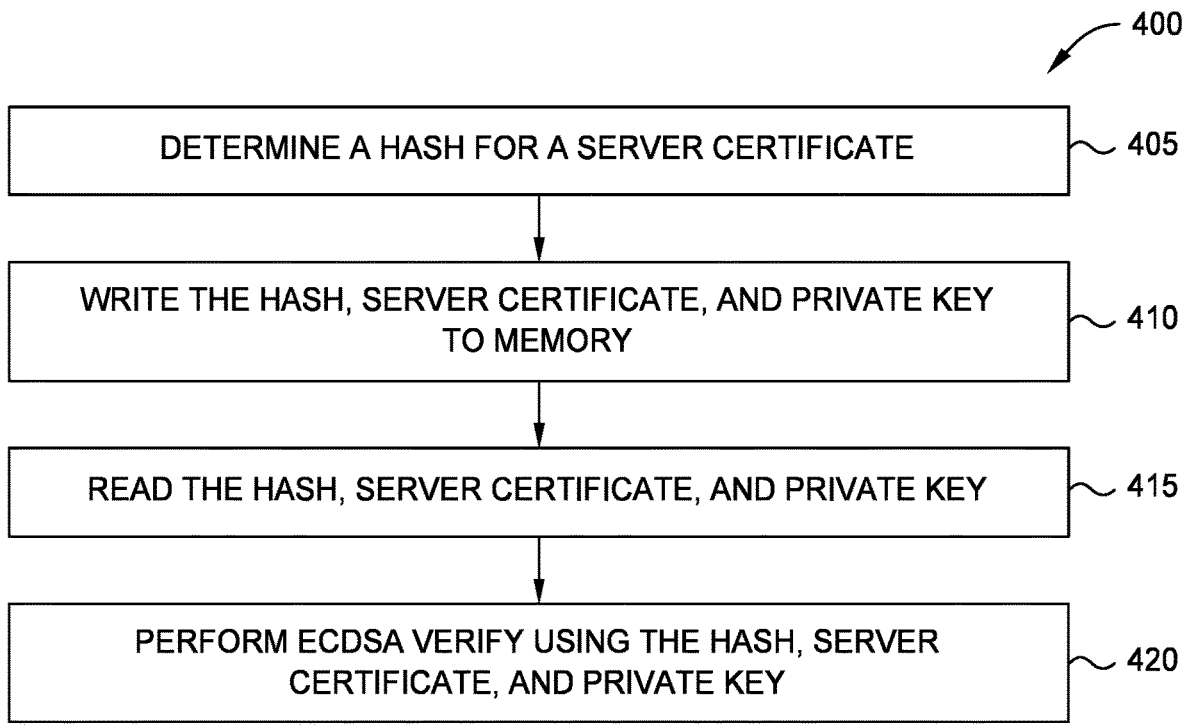
FIG. 4 is a flowchart for verifying a server certificate, according to examples, according to an example.

FIG. 4 is a flowchart of a method 400 for verifying a server certificate, according to examples, according to an example. At block 405, a requesting agent (e.g., the processor core or the PL core) determines a hash for a server certificate.

At block 410, the requesting agent writes the hash, the server certificate, and a private key to memory. As mentioned above, the memory could be the main memory 135, the accelerator memory 145, or the PL memory 315. Each of these memories can be secured and accessible to the PKI accelerator. The requesting agent can also program the PKI accelerator to retrieve the hash, the server certificate and the private key.

At block 415, the PKI accelerator reads the hash, the server certificate, and a private key from the memory.

At block 420, the PKI accelerator performs an Elliptic Curve Digital Signature Algorithm (ECDSA) verify using the hash, the server certificate, and the private key. The PKI accelerator can then inform the requesting agent of the results of the verify operation.

Thus, the method 400 illustrates that in addition to generating key pairs, the SmartNICs 100 and 300 can be used to verify a server certificate in a timely and power efficient manner.

Figure 5:
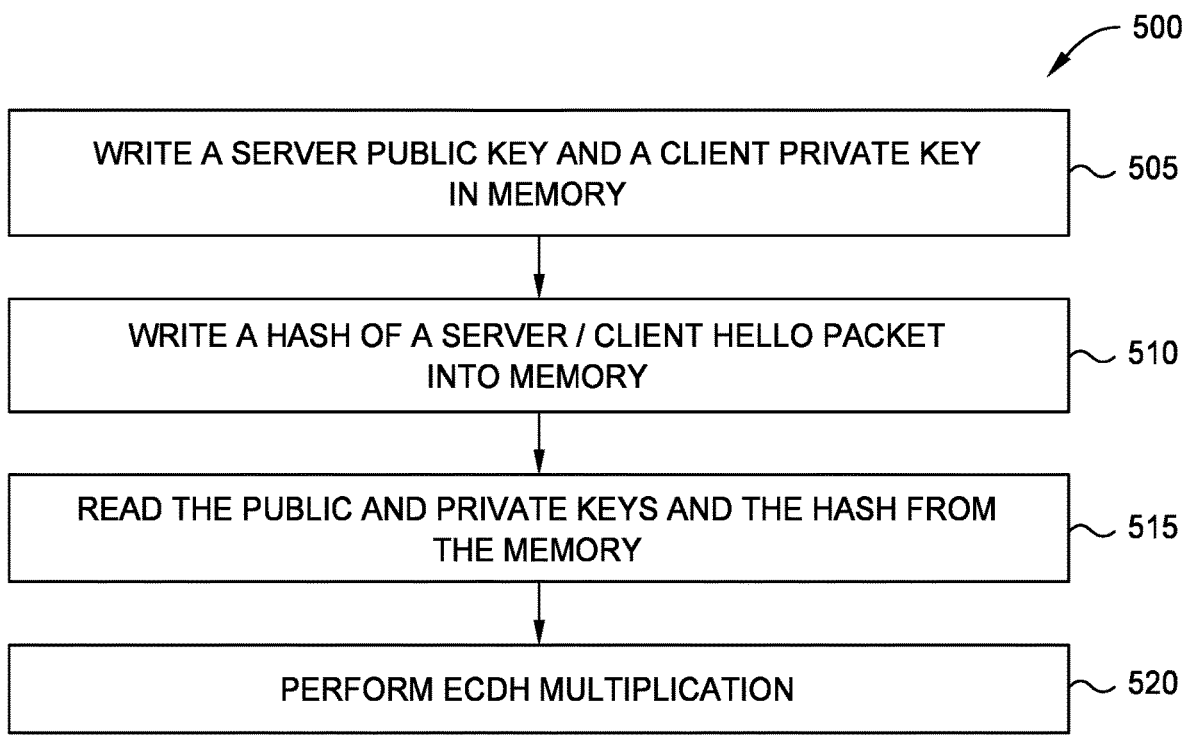
FIG. 5 is a flowchart for generating a handshake key, according to an example.

FIG. 5 is a flowchart of a method 500 for generating a handshake key, according to an example. At block 505, a requesting agent (e.g., the processor core or the PL core) writes a server public key and a client private key in memory. The memory could be the main memory 135, the accelerator memory 145, or the PL memory 315. Each of these memories can be secured and accessible to the PKI accelerator.

At block 510, the requesting agents write a hash of a server/client hello packet into the memory. The requesting agent can program the PKI accelerator to retrieve the public and private keys and the hash from the memory.

At block 515, the PKI accelerator reads the public and private keys and the hash from the memory.

At block 520, the PKI accelerator performs an ECDH multiplication using the public and private keys and the hash to generate a handshake key. Thus, the method 500 illustrates that in addition to generating key pairs, the SmartNICs 100 and 300 can be used to generate a handshake key between a server and client.

In general, the embodiments discussed in FIGS. 1-5 have many advantages over the centralized key generation model and the two methods that enable distributed key exchange in SmartNICs discussed above. Some non-limiting advantageous include:

Lower computational and power overhead: By using a distributed scheme and storing generated key pairs or session keys in an access controlled manner, the embodiments herein achieve more power efficiency by not requiring the keys be wrapped/unwrapped before securely ensuring consumption of the keys.

Adaptive, high performance key-pair and session key generation and exchange: PKI acceleration can either be performed in the HardIP, or PKI acceleration is augmented in PL.

Flexible agents making the TLS function calls to the PKI accelerator either using embedded HardIP cores or SoftIP accelerator function call requesters: This also provides flexibility within the SmartNIC should performance demands increase beyond the capabilities of the embedded HardIP cores or those embedded HardIP cores are deployed for other embedded tasks such that those tasks are not stalled due to the HardIP cores running the key-pair and session key generation and exchange software.

Secure enclave, firewalling, and access control to prevent side-channel attacks and allow for power efficient storage of cleartext keys without the need to wrap/unwrap those keys: Access from the trusted agent to the TLS requesting agents can be made via a path that is physically isolated from other agents, or logically isolated from other agents via access control checks of authorized source agents by means of an unmodifiable/non-spoofable physical identifier and encrypted and authenticated firewall rules.

Accelerator memory can be co-located with the PKI accelerator such that the same access controlled path by which the authorized source agent provided the command descriptor with secure metadata to the PKI accelerator, is the path by which the resultant key pairs or session keys generated or signed/verified by the PKI accelerator are subsequently accessed.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A smart network interface controller (NIC), comprising:
   a processor core configured to execute an operating system (OS), wherein the processor core is assigned a non-spoofable physical identifier to indicate the OS is an authorized requesting agent for retrieving public-private key pairs;
   an interconnect coupled to the processor core and comprising circuitry defining trusted pathways that are at least one of: physically isolated from untrusted pathways in the interconnect or logically isolated such that the trusted pathways are access controlled from untrusted agents in the interconnect;
   a Public Key Infrastructure (PKI) accelerator comprising circuitry configured to generate the public-private key pairs; and
   access control circuitry coupled between the interconnect and the PKI accelerator and configured to ensure only authorized requesting agents with correct non-spoofable physical identifiers are permitted to access the public-private key pairs generated by the PKI accelerator.

2. The smart NIC of claim 1, further comprising:
   programmable logic (PL) comprising a PL core assigned a second non-spoofable physical identifier to indicate the OS is an authorized requesting agent for retrieving public-private key pairs.

3. The smart NIC of claim 1, wherein the processor core, interconnect, PKI accelerator, and access control circuitry are part of a processor system in a system on a chip (SoC).

4. The smart NIC of claim 1, wherein the OS is configured to execute a transport layer security (TLS) stack in the processor core.

5. The smart NIC of claim 1, wherein the interconnect forwards the non-spoofable physical identifier to the access control circuitry.

6. The smart NIC of claim 1, further comprising:
   main memory; and
   accelerator memory in the PKI accelerator, wherein the main memory and the accelerator memory are configured to store the public-private key pairs generated by the PKI accelerator, where the main memory and the accelerator memory are cache coherent with caches in the processor core, and the access control circuitry is configured to ensure only the authorized requesting agents with correct non-spoofable physical identifiers are permitted to retrieve the public-private key pairs stored in the main memory and the accelerator memory.

7. The smart NIC of claim 1, wherein the PKI accelerator comprises:
   a random number generator (RNG) configured to generate random numbers in response to requests from the OS to be used to derive the public-private key pairs.

8. A smart network interface controller (NIC), comprising:
   a hardened processor core configured to execute a first operating system (OS), wherein the hardened processor core is assigned a first non-spoofable physical identifier to indicate the first OS is a first authorized requesting agent for retrieving public-private key pairs;
   a programmable logic (PL) core configured to execute a second OS, wherein the PL core is assigned a second non-spoofable physical identifier to indicate the second OS is a second authorized requesting agent for retrieving public-private key pairs;
   a Public Key Infrastructure (PKI) accelerator comprising circuitry configured to generate the public-private key pairs; and
   an interconnect configured to facilitate communication between the PKI accelerator and the hardened processor core and the PL core, wherein the interconnect comprises circuitry to ensure only authorized requesting agents comprising correct non-spoofable physical identifiers are permitted to retrieve the public-private key pairs generated by the PKI accelerator.

9. The smart NIC of claim 8, further comprising:
   access control circuitry coupled between the interconnect and the PKI accelerator and configured to ensure only the authorized requesting agents with a correct non-spoofable physical identifiers are permitted to access the public-private key pairs generated by the PKI accelerator.

10. The smart NIC of claim 9, further comprising:
    main memory;
    PL memory; and
    accelerator memory in the PKI accelerator, wherein the main memory, the PL memory, and the accelerator memory are configured to store the public-private key pairs generated by the PKI accelerator, where the main memory, the PL memory, and the accelerator memory are cache coherent with caches in the hardened processor core, and the access control circuitry is configured to ensure only the authorized requesting agents with a correct non-spoofable physical identifiers are permitted to retrieve the public-private key pairs stored in the main memory, the PL memory, and the accelerator memory.

11. The smart NIC of claim 8, wherein the hardened processor core, PL, interconnect, PKI accelerator, and access control circuitry are part of a system on a chip (SoC).

12. The smart NIC of claim 8, wherein both the first and second OSs are configured to execute a transport layer security (TLS) stack.

13. The smart NIC of claim 8, wherein the PKI accelerator comprises:
   a random number generator (RNG) configured to generate random numbers in response to requests from the OS to be used to derive the public-private key pairs.

14. A method comprising:
   writing, using a requesting agent, operation parameters for generating a public-private key pair into memory in a smart NIC, wherein the requesting agent is one of a hardened processor core or a programmable logic core in the smart NIC, wherein the requesting agent is assigned a non-spoofable physical identifier to indicate the requesting agent is authorized for retrieving public-private key pairs;
   reading the operation parameters using a Public Key Infrastructure (PKI) accelerator;
   generating the public-private key pair using the PKI accelerator;
   writing, using the PKI accelerator, the public-private key pair into the memory; and
   transmitting an interrupt to the requesting agent indicating the public-private key pair is ready, wherein access control circuitry is communicatively coupled between the requesting agent, and the memory and the PKI accelerator, wherein the access control circuitry ensures only authorized requesting agents with correct non-spoofable physical identifiers are permitted to access the public-private key pair stored in the memory.

15. The method of claim 14, further comprising, before writing the operation parameters into the memory:
   requesting, by the requesting agent, a public key from the PKI accelerator; and
   generating a random number to derive the public key using the PKI accelerator.

16. The method of claim 14, wherein the requesting agent executes an operating system that runs a transport layer security (TLS) stack.

17. The method of claim 14, wherein the requesting agent writes the operation parameters into a main memory in the smart NIC that is cache coherent with caches in the requesting agent, the method further comprises:
   programming the PKI accelerator to use a direct memory access (DMA) via an interconnect to read the operation parameters, wherein the interconnect is communicatively coupled between the requesting agent and the PKI accelerator and the main memory.

18. The method of claim 14, wherein the requesting agent writes the operation parameters into an accelerator memory within the PKI accelerator that is cache coherent with caches in the requesting agent, the method further comprises:
   programming the PKI accelerator to access the accelerator memory to retrieve the operation parameters without having to use an interconnect coupled between the requesting agent and the PKI accelerator.

19. The method of claim 14, further comprising:
   determining, using the requesting agent, a hash for a server certificate;
   writing the hash, the server certificate, and a private key to the memory;
   reading the hash, the server certificate, and a private key from the memory using the PKI accelerator; and
   performing an Elliptic Curve Digital Signature Algorithm (ECDSA) verify using the hash, the server certificate, and the private key in the PKI accelerator.

20. The method of claim 14, further comprising:
   writing, using the requesting agent, a server public key and a client private key into the memory;
   writing, using the requesting agent, a hash of a server/client hello packet into the memory;
   reading, using the PKI accelerator, the server public key, the client private key, and the hash from the memory; and
   performing Elliptic Curve Diffie-Hellman (ECDH) point multiplications using the PKI accelerator based on the server public key, the client private key, and the hash.

\* \* \* \* \*